United States Patent
Brown et al.

(10) Patent No.: US 7,100,053 B1
(45) Date of Patent: Aug. 29, 2006

(54) MONITORING AND MANAGING USER ACCESS TO CONTENT VIA A PORTABLE DATA STORAGE MEDIUM

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,393

(22) Filed: Apr. 28, 2000

(51) Int. Cl.
*H04K 1/00* (2006.01)

(52) U.S. Cl. .................................................. 713/185
(58) Field of Classification Search ................ 713/201
See application file for complete search history.

(56) References Cited

U.S. PATENT DOCUMENTS

| | | | | |
|---|---|---|---|---|
| 5,263,157 A | * | 11/1993 | Janis ............................... | 707/9 |
| 5,510,828 A | | 4/1996 | Lutterach et al. | |
| 5,555,376 A | * | 9/1996 | Theimer et al. ............ | 709/229 |
| 5,881,225 A | * | 3/1999 | Worth ........................ | 713/200 |
| 6,003,135 A | * | 12/1999 | Bialick et al. .............. | 713/201 |
| 6,006,332 A | * | 12/1999 | Rabne et al. ................ | 713/201 |
| 6,035,339 A | * | 3/2000 | Agraharam et al. ........ | 709/246 |
| 6,041,411 A | * | 3/2000 | Wyatt ......................... | 713/200 |
| 6,088,805 A | * | 7/2000 | Davis et al. ................. | 713/202 |

OTHER PUBLICATIONS

U.S. Appl. No. 09/560,394, filed Apr. 28, 2000, Brown et al.

* cited by examiner

*Primary Examiner*—Ayaz Sheikh
*Assistant Examiner*—Pramila Parthasarathy
(74) *Attorney, Agent, or Firm*—Marilyn Smith Dawkins Dillon & Yudell LLP

(57) ABSTRACT

In accordance with the method, system and program of the present invention, authority-designated settings are stored on a portable data storage medium in association with a particular user, wherein the authority-designated settings designate levels of access to particular types of content as determined by multiple authorities to the particular user. Transmittal of a selection of the authority-designated settings is required from the portable data storage medium in a transmittable data format to a particular authority-enabled system from among multiple authority-enabled systems, wherein each of the multiple authority-enabled systems provides access to multiple diverse types of content. The particular user is only allowed access to a selection of the multiple types of content that are enabled according to the authority-designated settings at the particular authority-enabled system.

1 Claim, 6 Drawing Sheets

220 {

| Authority | Type of setting | Content designation |
|---|---|---|
| Parent A | Television | Access only to PG or less; Access for 1 hour daily |
| Parent B | Radio | Access only to classical or oldies radio stations |
| . | . | . |
| . | . | . |
| . | . | . |
| Parent A | Books | Access only to Dr. Seuss books |
| Library A | Books | 2 book limit |

222 {

| Type of setting | Content designation |
|---|---|
| Television | Prefer cartoons |
| | |
| Radio | Oldies radio stations |

224 {

| Authority | Password | Authority designations | Authorization/Denial of Authorization Record | Location |
|---|---|---|---|---|
| Sylvia=parentA | Gen234 | Parent A, Parent B, Library A, Babysitter A | 11/21/00-Received access to television show A for 30 minutes; | tv1 |
| GeorgeG=parent B | asD25 | parent A, parent B, Business A | 11/21/00 - Received access to oldies radio station for 10 minutes. | Radio-car 1 |

(226 points to Authority designations column)

FIG. 6

MONITORING AND MANAGING USER ACCESS TO CONTENT VIA A PORTABLE DATA STORAGE MEDIUM

CROSS-REFERENCE TO RELATED APPLICATION

The present application is related to the following co-pending application, which is filed on even date herewith and incorporated herein by reference:

(1) U.S. patent application Ser. No. 09/560,394.

BACKGROUND OF THE INVENTION

1. Technical Field

The present invention relates in general to an electronic chaperone and, in particular, to a method, system and program for electronically monitoring and managing user access to content via a portable data storage medium. Still more particularly, the present invention relates to a method, system and program for utilizing a single portable data processing system to manage user access across multiple diverse content access platforms according to access restrictions designated by an authority to the user of the portable data storage medium.

2. Description of the Related Art

As the tide is turning towards a paperless world, computers are becoming more prevalent in order to replace many functions previously performed utilizing paper. In particular, computing devices, such as a personal digital assistant, laptop computer and cellular/digital telephone are becoming more commonplace as a personal, portable computer system. Such devices are typically designed to provide reliable and efficient transmittal and storage of data. For example, many digital telephones not only include capabilities to transmit and receive voice data, but to transmit and receive electronic data such as stock quotes, current weather and news. A small display device is typically provided to display the electronic data.

Global positioning systems (GPSs) add to the applications of personal, portable computer systems. In the consumer world, as personal computer systems include GPSs and communicate to a network, personal computer systems may receive regionalized advertising and sale updates. For example, a shopper's eye system, incorporating a personal digital assistant (PDA) equipped with a GPS and wireless Internet Protocol (IP), enables a two-way channel with a central control center through which retailers can present customized offers to nearby shoppers based on their particular interests. In particular, the location of a user, shopping goals, preferences and related history may be detected by a central control center for a mall the user has entered. This information is routed to stores in the mall and as the stores receive this information, they may create a customized offer of bundled goods and services. The offer is transmitted from the central control center to the user's PDA.

Accountability of users for entering a particular store or office, seeing particular images, visiting particular web sites, eating particular foods, etc. has been a long time struggle for parents who cannot attend to their children all the time and companies who cannot personally monitor employees all the time. In particular, accountability for content viewed on a computer or television has led to software applications that allow a parent or employer to lock out certain types of web sites and television stations and/or monitor use. However, while these software applications, associated with the computer or television, monitor and limit access on that computer or television, they do not monitor and limit access on all computers or televisions that a particular user may have access to. In addition, there are typically areas other than content of web sites and television programs that a parent or company would like to monitor.

In view of the foregoing, it would be preferable to provide a portable computer system as an electronic chaperone that includes multiple types of authority-designated settings for multiple diverse events that are transmittable to multiple diverse access platforms in order to universally enforce an authority-designated access policy. In addition, it would be preferable to allow a user to designate multiple diverse preferences. It would be advantageous to transmit the authority-designated settings to multiple diverse locations and/or devices, such as retailers, in order that the retailer can determine and transmit to the electronic chaperone a suitable selection of products and services provided by the retailer or media provider according to the authority-designated preferences. In addition, it would be preferable to transmit the authority-designated settings to a device, such as a television, in order that the authority-designated settings are automatically transferred to the television's parental control application settings, for example.

SUMMARY OF THE INVENTION

In view of the foregoing, it is therefore an object of the present invention to provide an electronic chaperone.

It is another object of the present invention to provide an improved method, system and program for electronically monitoring and managing user access to content via a portable data storage medium.

It is yet another object of the present invention to provide an improved method, system and program for utilizing a single portable data processing system to manage user access to content according to access restrictions designated by an authority to the user of the portable data storage medium.

In accordance with the present invention, authority-designated settings are stored on a portable data storage medium in association with a particular user, wherein the authority-designated settings designate levels of access to particular types of content as determined by multiple authorities to the particular user. Transmittal of a selection of the authority-designated settings is required from the portable data storage medium in a transmittable data format to a particular authority-enabled system from among multiple authority-enabled systems, wherein each of the multiple authority-enabled systems provides access to multiple diverse types of content. The authority-designated settings received at the particular authority-enabled system are compared with the multiple types of content provided by the particular authority-enabled system. The particular user is only allowed access to a selection of the multiple types of content that are enabled according to the authority-designated settings at the particular authority-enabled system, such that multiple diverse authority-enabled systems enforce an authority-designated access policy for a particular user for access to multiple types of content provided across multiple diverse authority-enabled systems.

In addition, in a preferred embodiment, a user may transmit a request from the portable computer system to a particular authority for a one time access to a particular type of content.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 illustrates a pictorial illustration of multiple data storage structures for storing authority-designated settings and other data in accordance with the method, system and program of the present invention.

DETAILED DESCRIPTION OF PREFERRED EMBODIMENT

The present invention may be executed in a variety of systems, including a variety of computing systems and electronic devices under a number of different operating systems. In a preferred embodiment of the present invention, the computer system is a portable computing system such as a notebook computer, a palmtop computer, a personal digital assistant, a telephone or other electronic computing system that may also incorporate communications features that provides for telephony, enhanced telephony, messaging and information services. However, the computer system may also be, for example, a desktop computer, a network computer, a midrange computer or a mainframe computer. Preferably, in order to enable at least one of these communications features, the computer system is able to be connected to a network, such as the Internet by either a wired link or wireless link. In addition, the computer system may be a stand-alone system or part of a network such as a local-area network (LAN) or a wide-area network (WAN). Therefore, in general, the present invention is preferably executed in a computer system that performs computing tasks such as manipulating data in storage that is accessible to the computer system. In addition, the computer system includes at least one output device and at least one input device.

Figure 1:
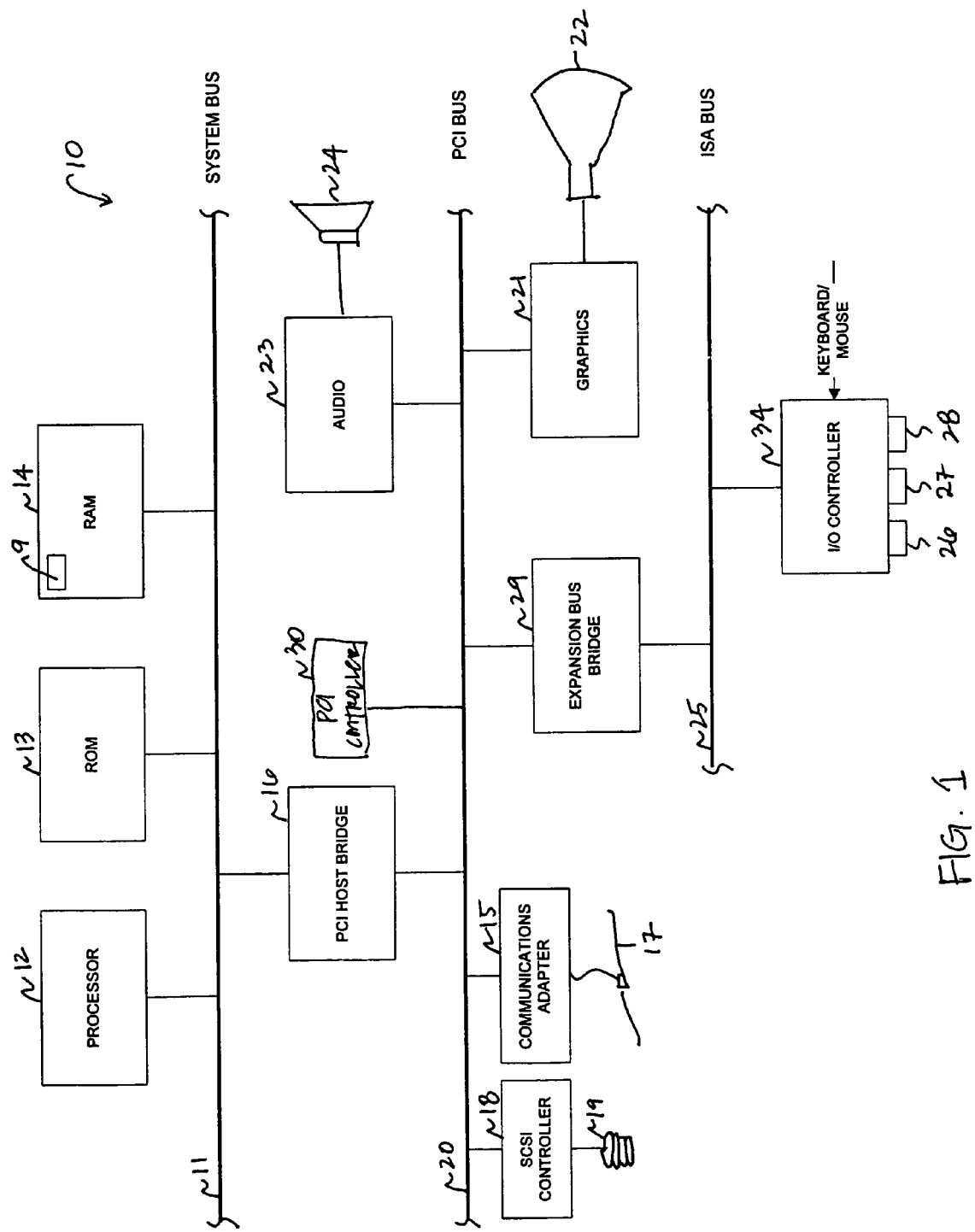
FIG. 1 is an illustrative embodiment of a data processing system with which the method, system and program of the present invention may advantageously be utilized.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 4, 5 and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
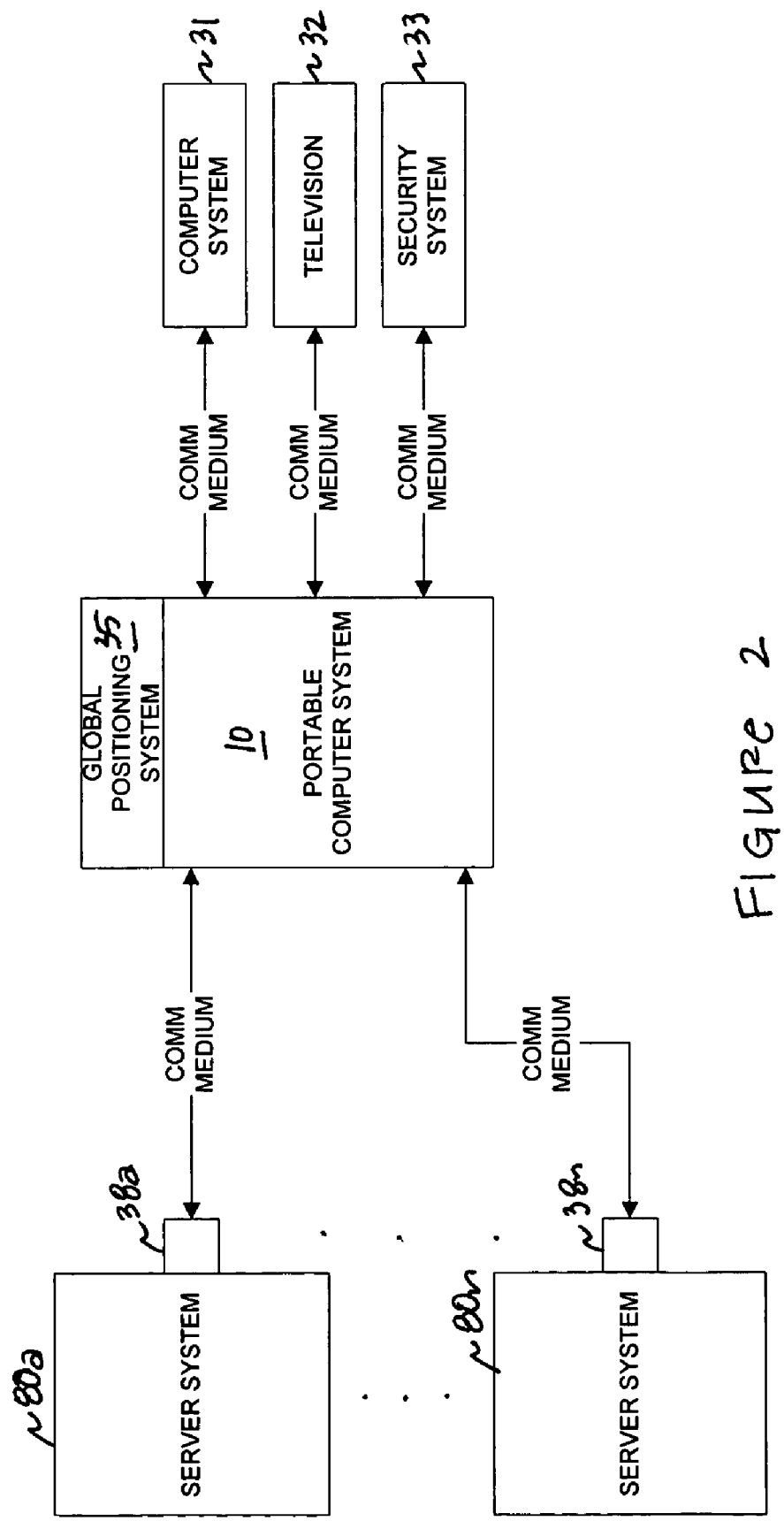
FIG. 2 illustrates a high level block diagram of one embodiment of an electronic chaperone management system in accordance with the method, system and program of the present invention.

With reference now to FIG. 2, there is illustrated a high level block diagram of one embodiment of an electronic chaperone management system in accordance with the method, system and program of the present invention. As depicted, a portable computer system 10 that preferably comprises multiple diverse authority-designated settings and user-designated preferences for at least one user communicates with multiple diverse server systems 80a–80n via a communications interface (or across a communication interface). In addition, portable computer system 10 communicates with multiple diverse computer systems, such as computer system 31, multiple diverse televisions, such as television 32 and multiple diverse security systems, such as security system 33.

Computer system 31, television 32, security system 33 and server systems 80a–80n are representative of, and not intended to limit, types of electronic device platforms that may communicate with portable computer system 10 and control access to content. Advantageously, each of these electronic device platforms is equipped with an accountability application that limits access to multiple types of content that are enabled by the electronic devices. Content may include, but is not limited to, graphical images, audio sounds, products, locations, data, and other types of access-controllable items.

The communications medium may comprise wired or wireless communications or other communications media that enables transmission of data. Moreover, the communications medium may comprise a link to a network, such as the Internet, or a direct data link. Furthermore, data may be transmitted from server systems 80*a*–80*n* to an electronic mail address that is accessible to portable computer system 10.

Data exchange across the communications medium is advantageously performed in at least one of multiple available data transmission protocols and is preferably supported by a common data structure format, such as the extensible mark-up language (XML) data structure format. Data transmission protocols may include, but are not limited to, Transmission Control Protocol (TCP), Internet Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file that might be transmitted from portable computer system 10 to television 32, as depicted below, preferably contains data that is distinguished by attributes on elements and may be wrapped within a larger element. The elements, format of the elements and data included with the elements is provided to depict examples and is not intended to limit the types of elements, format of elements or data included with elements that are in an XML data file. For example, the data attributed to element "<TimeStamp> </TimeStamp>" designates the time that the data was attributed to the XML data file.

```
<ACCESS TimeStamp="888965153" UserID="Matilda"
  Authority="Mom" TelevisionRatingLimit="PG" Tele-
  visionTimeLimit="1                                  hour"
  TelevisionContent="Educational"
  TelevisionContent="Cartoon">
```

A second example of the same data in an alternate XML data format that includes elements is illustrated below:

```
<TimeStamp>888965153</TimeStamp>
<UserID>Matilda</UserID>
<Authority>Mom</Authority>
<TelevisionRatingLimit>PG</TelevisionRatingLimit>
<TelevisionTimeLimit>1 hour</TelevisionTimeLimit>
<TelevisionContent>Educational</TelevisionContent>
<TelevisionContent>Cartoon</TelevisionContent>
```

In particular, in the examples, a user "Matilda" is given television access to shows that are rated parental guidance (PG) or lower for up to an hour a day. The user may watch shows with content that is rated educational or as a cartoon. These access limits may be designated by a parent or guardian "mom" in order to limit television access by the user.

In the example of the XML data format as the common transmittable data format, a data validation file such as a document type definition (DTD) or schema is preferably utilized to validate XML data files. In addition, a schema preferably translates multiple XML data files. Moreover, a style sheet such as an extensible stylesheet language (XSL) file is preferably utilized to provide a style specification for the XML data at the receiving system. In particular, DTDs, schemas, and XSL files may be, for example, transmitted with an XML data file to a receiving system or downloaded at the receiving system from an alternate source. In the present example, the DTD or schema would verify that all the data required for authority designated access is included in the XML data file.

Data transmission across the communications medium may be initiated by portable computer system 10 or by an alternate device such as server system 80*a*–80*n*, computer system 31, television 32 or security system 33. Portable computer system 10 may broadcast authority-designated settings via an infrared or RF transmission whereby devices within a particular proximity detect the authority-designated settings and respond. In addition, portable computer system 10 may selectively transmit authority-designated settings to a selection of devices by encrypting the transmission. Multiple types of encryption techniques that are known in the art may be utilized.

Devices that receive the broadcasted and selectively transmitted signals from portable computer system 10 detect a proximate location of portable computer system 10 from the broadcast signal. In addition, portable computer system 10 may include a global positioning system 35. A location detected by the global positioning system may be included with a broadcast or selective transmission of the authority-designated setting such that a three-dimensional location of portable computer system 10 is provided.

Server systems 80*a*–80*n* that receive wireless transmissions from portable computer system 10 preferably include transmission transceivers 38*a*–38*n*, in order to detect data transmissions from portable computer system 10. Transmission receivers 38*a*–38*n* may provide multiple ranges of reception of data transmissions from portable computer system 10.

In addition, server systems 80*a*–80*n*, computer system 31, television 32, or security system 33 may also transmit a location or other data, such as authority-designated settings to portable computer system 10. In particular, authority-designated settings are preferably transmitted to portable computer system 10 for storage on portable computer system 10 via alternate computer systems, such as computer system 31 that are associated with the authority providing the authority-designated settings.

Each of computer system 31, television 32, and security system 33 advantageously include detectors (not shown), such as video detectors, for sensing the number of users within a particular proximity of each of the devices. In order for access to be obtained to the devices, the devices may require that authority-designated settings for each of the detected users are received. For example, television 32 may detect that three users are within a particular proximity of television 32 and require that three sets of authority-designated settings are received at television 32 to enable access.

Server systems 80*a*–80*n* preferably represent diverse independent retailers or consumer providers that are enabled to independently gather data from portable computer system 10. However, server systems 80*a*–80*n* may also communicate via a network connection, such as the Internet. Moreover, each of server systems 80*a*–80*n* may comprise multiple servers connected via a network or data link with access to multiple data storage media. In addition, computer system 31, television 32, and security system 33 may be further connected to a network connection, such as the Internet.

It is important to note that an authority over a user that sets authority-designated settings for the user on portable computer system 10 may include any individual or organization which has authority over a user. For example, a parent, teacher, business, volunteer organization or government may have authority over a user.

In addition, it is important to note that the data stored on portable computer system 10 may alternatively be stored on a personal storage device associated with a particular user, such as a smart card. The personal storage device is advantageously proffered by the user and is accessible to server systems 80*a*–80*n*, computer system 31, television 32 and security system 33 via a personal storage device adapter coupled to any of the authority-enabled devices. In addition, other examples of personal storage devices include the ibutton™ (ibutton is a trademark of Dallas Semicondutors Inc.) and body-embedded microchips.

Figure 3:
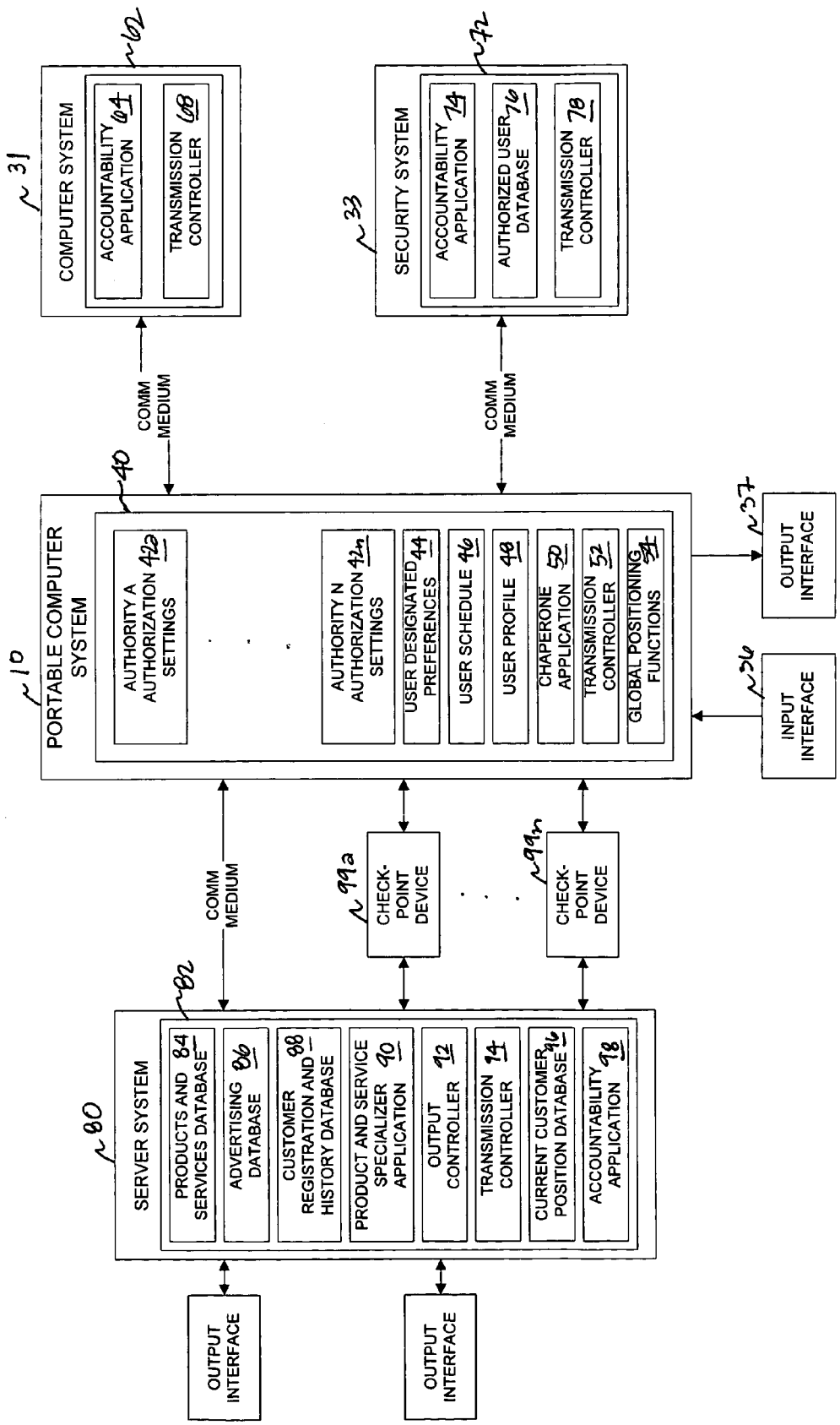
FIG. 3 depicts a detailed block diagram of one embodiment of an electronic chaperone management system in accordance with the method, system and program of the present invention.

Referring now to FIG. 3, there is depicted a detailed block diagram of one embodiment of an electronic chaperone management system in accordance with the method, system and program of the present invention. Server system 80 preferably supports electronic business for a particular retailer or consumer provider. In the present example, server system 80 includes electronic business related data, services and applications stored in a data storage medium 82 including a products and services database 84, an advertising database 86, a customer registration and purchase history database 88, a product and service specifier application 90, an output controller 92, a transmission controller 94, a current customer database 96, and an accountability application 98. The databases are preferably data storage structures that hold multiple entries and may be searched and/or filtered according to particular criteria. In addition, in an alternate embodiment, alternate types of data may be stored in data storage medium 82. Moreover, in an alternate embodiment, additional services and applications may be stored in data storage medium 82.

Server system 80 controls exchange of data to and from multiple portable computer such as portable computer system 10 via transmission controller 94. In particular, transmission controller 94 establishes a connection via the communication medium with portable computer system 10 whereby the current location of portable computer system 10 and authority-designated settings and user-designated preferences stored therein may be transmitted to server system 80. The current customer location may be continuously updated in current customer database 96 if the customer chooses to continuously broadcast. In addition, transmission controller 94 preferably supports data exchange in a transmission data format, and in particular in the XML data format.

Server system 80 also controls output of data to multiple diverse output interfaces 100a–100n via output controller 92. Output controller 92 may control transmission of data to multiple diverse output interfaces 100a–100n via a wired or wireless communication medium. The diverse output interfaces may include, but are not limited to, output interfaces within a store for advertising, output interfaces within a store for displaying data to employees only, output interfaces within a shopping arena, and output interfaces along a road-side. Output interfaces 100a–100n may comprise multiple diverse types of output devices including, but not limited to, flat-screen monitors, LCD graphical displays, electronic paper displays, electronic billboard displays, tactile-detectable displays, audio speakers, printers, and other forms of electronic media output devices.

Products and services database 84 preferable comprises multiple types of content provided by a retailer or consumer provider including diverse products and services. The products and services may include, for example, multiple types of descriptors, prices and conditions. For example, the products and services for a movie theater may include a listing of current movie titles, ratings, descriptions, reviews, etc. In addition, the products and services for a movie theater may include a listing of current refreshments and candies with prices and food content breakdown.

Advertising database 86 preferably comprises multiple electronic advertisements including graphical rendering, audio and video. For example, the movie theater advertising database 86 may include a video commercial of a new movie title. In addition, the movie theater advertising database 86 may include graphical advertising for refreshments, including audio advertising for the refreshments. The electronic advertisements stored in advertising database 86 may be stored according to multiple searchable keywords. In addition, the advertisements stored in advertising database 86 may be stored in a compressed file that is transferable to portable computer system 10.

Customer registration and history database 88 preferably includes registration data for multiple users and any purchase history as a registered customer. Preferably, customer registration data is received from portable computer system 10 in an XML data format with a schema that defines the fields of data. In particular, the XML data and schema may be transmitted from portable computer system 10 at a store location or via the Internet to a retailer's web site. Server system 80 may automatically fill in an electronic registration form for the user from the schema definitions or may transmit a request to the user to select whether or not to automatically fill in an electronic registration form. In addition, for each customer purchase a history of the date, time, place, sales person, price paid, etc. associated with the purchase is preferably automatically recorded in customer registration and history database 88.

Product and service specifier application (PSA) 90 preferably analyzes authority-designated settings and user-designated preferences when a user is detected. First, PSA 90 may determine a selection of products and services from among products and services database 84 that meet the authority-designated settings and user-designated preferences as currently stored in current customer database 96. In addition, the selection of products and services from among products and services database 84 may be further specified according to the user's purchase history, schedule, user profile and current location. The selection of specified products and services may include photo, video and audio clippings in addition to descriptions and prices. Transmission controller 94 preferably controls secure transmission of the selection of specified products and services to the user's portable computer system 10. In addition, the specified products and services may advantageously include electronic coupons and rebates for use when purchasing the products or services at the venue or on-line.

In the example of a movie theater, a parent, as an authority to a child, may designate a setting for no movies or television greater that a "PG" rating on the child's portable computer system. The child may designate a preference for comedies. Therefore, PSA 90 for a movie theater server system 80 would receive the parent-designated setting and child-designated preference and search the movie theater products and services database 84 for movies that are rated "PG" or less and are comedies. A selection of movie listings that first meet the parental setting and then meet the child preference is transmitted to the child's portable computer system.

A second function of PSA 90 is determining service and product recommendations to a retailer staff. Service and product recommendation to a retailer staff may be determined from the authority-designated settings and user-designated preferences, location, registration, previous purchases, the store's customer service policy and available products and services. Output controller 92 preferably controls distribution of service and product recommendations to output interface(s) that are accessible only by staff.

For example, a parent designates that a child should have no snacks after 2 pm and an hour long nap on the child's portable computer system. When the child is dropped off at a child-care school, the server system for the child care school detects the parent-designated preferences for the child from the child's portable computer system and alerts staff of the parental requests, for example, at a display device accessible to the staff-only or through a printed copy.

A third function of PSA 90 is determining which advertising selections from advertising database 86 to display in a store, in an open arena, on the road-side and on-line. Advertising selections are preferably determined by PSA 90 according to authority-designated settings and user-designated preferences and settings in current customer database 96 and the type of output interface. For example, an authority may designate on a child's portable computer system that a child should not be shown electronic advertising for cigarettes. Preferably, PSA 90 would determine alternate types of electronic advertising that do not include cigarettes when the presence of the child's portable computer system is detected within a particular proximity, even if the child has programmed a preference for cigarettes.

Accountability application 98 preferably provides for limiting content accessed by a particular user according to acceptable products and services determined by PSA 90. In communication with server system 80 may be multiple dispersed detection devices 99a–99n that retrieve authority-designated settings for a particular user from multiple portable computer systems and act as check-points for controlling accessing to different levels of content provided by the retailer or consumer provider. For example, an amusement park may include a check-point device at each ride for requiring transmittal of authority-designated settings from a portable computer system prior to entering the ride. At each check-point device, the authority-designated settings of types of rides allowed, types of content allowed, age of the user, medical conditions, etc. would be transmitted from portable computer system 10 to server system 80 the check point device. PSA 90 would determine acceptable products and services for the user according to authority-designated settings and accountability application 98 would determine whether access to that particular ride is provided for by PSA 90. If access is permitted, accountability application 98 would transmit an authorization signal to the check-point device to allow access to the user.

In another example, a library may include a check-point device at each check-out point where a user is required to transmit authority-designated settings to the check-point device with the user's electronic library identification from the user's portable computer system in order to check-out books. PSA 90 would determine which books in inventory contain content that is acceptable in view of the authority-designated setting and accountability application 98 would verify that each book requested for check-out by the user is authorized according to the content selections by PSA 90. The authority-designated settings for a library check-out may be designated, for example, by a parent or guardian for a child or by the library. For example, if a user repeatedly checks-out large volumes of new books and returns the books late, the library may designate on the user's portable computer system that the user may only check out a particular number of books within a particular time period. If for example, the user went to another library, preferably the alternate library would detect the library-designated setting for the user and restrict the user to the limited number of check-outs as well.

Portable computer system 10 preferably includes multiple authority-designated setting and user-designated preferences recorded in a single database or multiple databases and applications stored in a portable data storage medium 40. In the present example portable data storage medium 40 is depicted as internally accessible to portable computer system 10, however in alternate embodiments, portable data storage medium 40 may be accessible externally or remotely. In addition, in alternate embodiments, the data included on portable data storage medium 40 may be provided by a personal storage medium, such as a smart card.

In the example illustrated, authority-designated settings include authority A authorization settings 42a through authority N authorization settings 42n. Included in the authorization settings may be access settings for budget preferences, location preferences, visual preferences, broadcast preferences, etc. In addition, authorization settings may designate who alternate authorities may be. For example, a parent may designate that only a teacher or a selection of family friends may include authorization settings on a child's portable computer system.

Each authority preferably provides a secured listing of authorization settings to portable computer system 10 via data entry to input interface 36 or data transmittal via the communication medium that designate levels of access for a user to multiple types of content that can only be altered in any way by that authority. For example, a parent may designate multiple levels of authorization for a child at an amusement park. The child may be restricted from leaving a particular area of the park, and may be restricted from particular types of rides. Attempts to adjust authority settings 42a–42n preferably result in revoking authorization settings.

Advantageously, in addition to determining authority-designated settings an authority may directly access particular portions of data stored on portable computer system 10. Preferably, data received at portable computer system 10 in response to access or denial of access to content are recorded at portable computer system 10 in authorization settings 42a–42n according to the authority that designated the authorization settings utilized. For example, if a parent designates authorization settings for television viewing for a child, then a recording of accesses to television stored on portable computer system 10 is preferably retrievable by the parent.

In addition, advantageously, an authority may remotely adjust authority-designated settings. A user may transmit a request to an authority via an alternate data processing system that is accessible to the authority. The authority may designate a one-time access, multiple accesses or change authority-designated settings remotely and transmit the designations to portable computer system 10. For example, a television authority-designated setting may restrict a child from watching television that is rated higher than PG, however a special is coming on television that is rated PG-17 that the child requests to watch based on educational value. The child's request may be transmitted to a parent's computer at work where the parent designates a one-time authorization for the show and transmits the authorization to the child's portable computer system.

In another example, a child may go with a friend to a new theme park where there are not authority-designated settings on the child's portable computer system to allow the child to enter. The child's portable computer system would receive a listing of products and services for the theme park that is transmittable to an authority at a remote computer system. The authority, such as the parent, could view the products and services and transmit a selection of authority-designated settings to the child's portable computer system such that the child can go into the theme park.

In addition to including authority-designated settings and user-designated preferences on portable computer system 10, the user's schedule 46 and user profile 48 are preferably included. The user's schedule 46 preferably includes an electronic calendar of events, appointments and tasks. User profile 48 preferably includes personal data about the user such as name, age, home data, work data, payment account information, marital status, primary language, children, etc. In addition, user profile 48 may include encrypted registration ID's for various retailers as a result of the user registering with the retailer that can be easily decrypted by the retailer's server system. Moreover, user profile 48 may include cookies from registration with multiple retailers.

Moreover, portable computer system 10 includes global positioning functions 54. Preferably portable computer system 10 includes hardware that provides for a global positioning system (GPS) that detects the position of portable computer system 10 and receives information about surroundings including traffic, descriptions of stores and offices, etc. The position of portable computer system 10 and surrounding are preferably utilized by global positioning functions 54 to provide maps of the current location with directions to stores and offices, routes to avoid traffic, etc. In addition, the position of portable computer system 10 may be utilized by global positioning functions 54 to monitor and regulate the movement of a user. For example, an authority-designated setting may limit a user to a particular portion of a ski slope. Global positioning functions 54 compares the user's position with the authority-designated setting and may provide a warning to the user if they are near a boundary. In addition, a log of locations can be recorded and transmitted to an authority's computer system or retrieved at a later time. Moreover, global positioning functions 54 may attach a user location to authority-designated settings that are transmitted from portable computer system 10.

Portable computer system 10 includes a chaperone application 50 that responds to data received and requested from other data processing systems, including server system 80, computer system 31 and security system 33. In addition, chaperone application 50 provides analysis of products and services provided by server system 80 in view of authorization settings 42a–42n, user designated preferences 44, schedule 46, user profile 48, global positioning functions 54 and other data stored on portable computer system 10. In addition, chaperone application 50 controls whether authorization settings 42a–42n are broadcast or selectively transmitted.

In analyzing, for example, the selection of products and services received from server system 80, chaperone application 50 preferably further filters the selection of products and services according to authority-designated settings 42a–42n and user-designated preferences 44. In addition, preferences may be set in authority-designated settings 42a–42n or user-designate preferences 44 to filter particular settings, preferences, schedule data and profile data prior to transmittal. Therefore, chaperone application 50 acts to filter all data that is transmitted from and received at portable computer system 10 according to authority-designated settings 42a–42n or user-designate preferences 44.

Portable computer system 10 is advantageously a portable data processing system such as personal digital assistant, notebook computer or other computing device that is easily transportable. In addition, portable computer system 10 is customizable to a user's preferences. For example, a user may choose a portable computer system 10 with a black and white display while another user may choose a color display. Moreover, computer system 10 can be upgraded to include new features, applications, and functions.

Portable computer system 10 advantageously includes an input interface 36 for a user or authority to enter data and an output interface 37 for a user or authority to received data. Input interface 36 may include input devices including, but not limited to, a keypad, a keyboard, a mouse, a stylus, a vocal recognition system, a biometric device, a tactile-detectable device and any other device that allows the user to directly provide data to portable computer system 10. Output interface 37 may include output devices including, but not limited to, a graphical display device, audio speakers, a printer, and any other device that provides a user with detectable data.

Results of analysis and filtering performed by chaperone application 50 are preferably output to output interface 37. In particular, a user may designate output preferences in user profile 48, such as requiring a particular font size, language or a display that is color-blind ready. Chaperone application 50 preferably adjusts output of results to output interface 37 according to the user's output preferences.

In other examples of platforms with which portable computer system 10 communicates to control access, computer system 31 includes a data storage medium 62 comprising an accountability application 64 and a transmission controller 63. Accountability application 64 preferably controls access to content provided by computer system 31 according to authority-designated settings received from portable computer system 10. Preferably, prior to use of computer system 31, authority-designated setting are required to be transmitted to computer system 31 from portable computer system 10. Transmission controller 68 preferably controls transmission of monitored usage of computer system 31 to portable computer system 10.

According to the authority-designated settings, accountability application specializes the access that the user is provided via computer system 31. For example, if an authority-designated setting limits usage of the Internet for that day for that user to one hour and forty-five minutes of usage have been recorded at portable computer system 10, then accountability application 64 would limit usage of the Internet to fifteen more minutes and would then control transmission of a recording of time spent on the Internet to portable computer system 10. In another example, an authority-designated setting received from portable computer system 10 may limit the user from accessing games on computer system 31.

In yet another example of platforms with which computer system 10 communicates, security system 33 includes a data storage medium 72 that may be internally or remotely accessible comprising accountability application 74, authorized user database 76 and transmission controller 78. Accountability application 74 preferably controls access to a location protected by security system 33 according to authority-designated settings. Preferably, security system 33 requires authority-designated settings from portable computer system 10 in order to determine access to a particular location. In addition, authorized user database 76 may include biometric or other personalized data for authorized user's that is required for access. For example, a user may be required to pass a biometric scan and transmit authority-designated settings to security system 33. Thereby, if an employee needs special access to a particular part of the building on a particular day, authority-designated settings for that access may be transmitted to the employee's portable computer system, however the employee must also pass the biometric scan for entry. Transmission controller 78 advantageously controls transmission of entry records, such as data, time and location of entry, to portable computer system 10.

Preferably, with authority-enabled platforms such as server system 80, computer system 31, security system 33 and others such as television and radio, an accountability application resides at the platform that is updated according to authority-designated settings received from portable computer system 10. However, if a platform does not provide an accountability application, an accountability application may be transmitted from portable computer system 10 with the authority-designated settings.

In another example of one of the multiple applications of the present invention, a company that is sending representatives to a conference may be required to have the representatives sign non-disclosure agreements prior to attending the conference and receive company authorization to be in attendance. After an authorized representative signs the papers, a company transmits an encrypted authority-designated setting to the representative's portable computer system that includes verification of the signature and provides authorization for the representative to attend the conference. In addition, the company transmits a decryption key to a server system that will control access to the conference. When the representative arrives at the conference, the encrypted authority-designated setting that authorizes the representative is preferably transmitted from the representative's portable computer system to the server system that has access to the decryption key. The authority-designated setting is decrypted and the server system indicates that the user is authorized for attendance and may then authorize printing a badge for the representative or transmitting an electronic pass to the representative's portable computer system that is required by security systems located at each room of the convention for access to the room.

Figure 4:
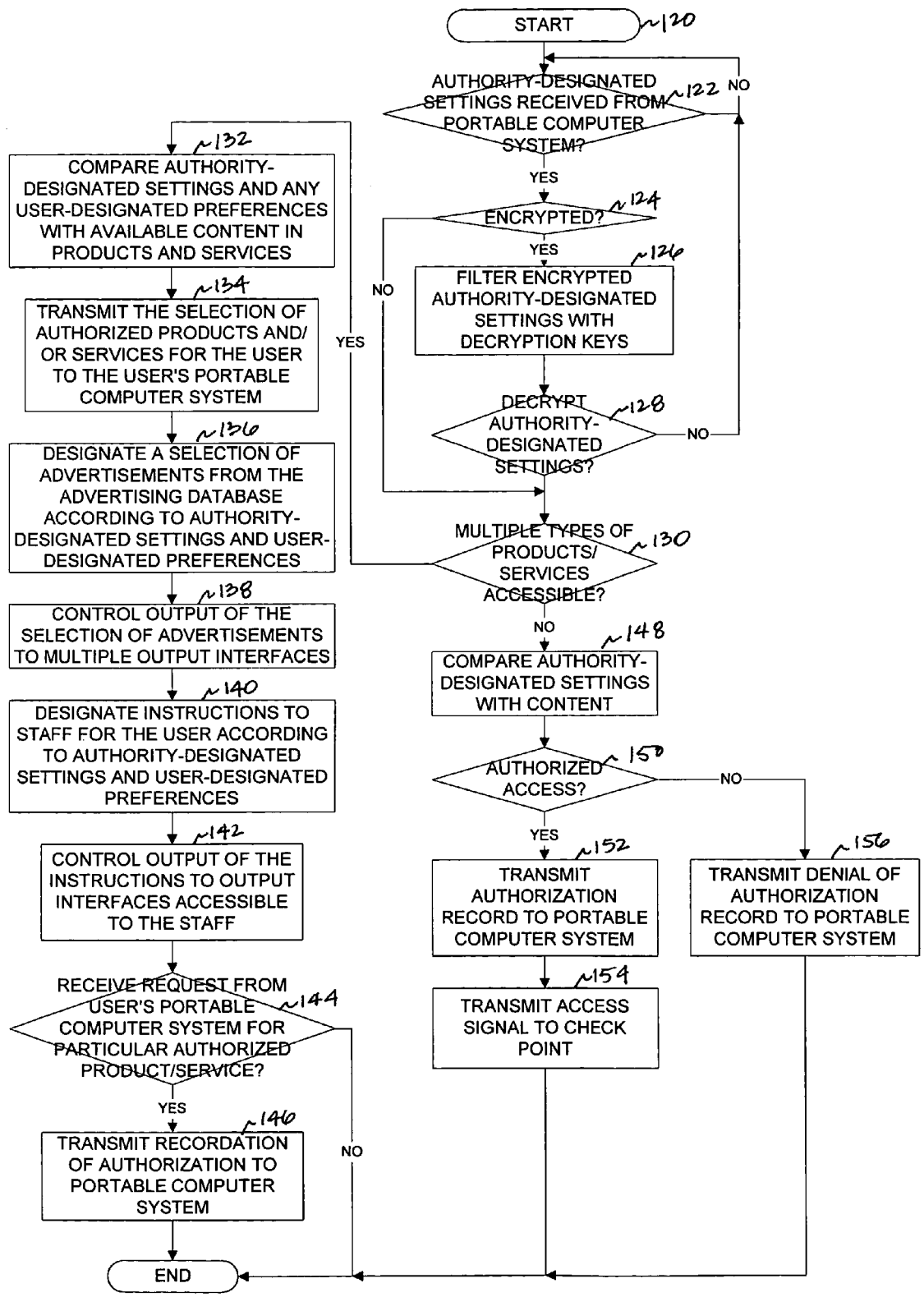
FIG. 4 illustrates a high level logic flowchart of a process and program for controlling access to a multiple types of content provided by a particular platform in accordance with the present invention.

With reference now to FIG. 4, there is depicted a high level logic flowchart of a process and program for controlling access to a multiple types of content provided by a particular platform in accordance with the present invention. As depicted, the process starts at block 120 and thereafter proceeds to block 122. Block 122 illustrates a determination as to whether or not authority-designated settings are received from a portable computer system. If authority-designated settings are not received, then the process iterates at block 122. If authority designated settings are received, then the process passes to block 124. Block 124 depicts a determination as to whether or not the authority-designated settings are encrypted. If the authority-designated settings are not encrypted, then the process passes to block 130. If the authority-designated settings are encrypted, then the process passes to block 126. Block 126 illustrates filtering the encrypted authority-designated settings with available decryption keys. Next, block 128 depicts a determination as to whether or not the authority-designated settings are decrypted. If the settings are not decrypted, then the process passes to block 122. If the settings are decrypted, then the process passes to block 130.

Block 130 illustrates a determination as to whether or not multiple types of products/services are accessible. For example, a server system may include a database of multiple types of products/services that are available. Alternatively, a security system typically only includes one point of access. If multiple types of products/services are not accessible, then the process passes to block 148. If multiple types of products/services are accessible, then the process passes to block 132.

Block 132 depicts comparing the authority-designated settings and any user-designated preferences with the available content in the products and services. For example, the authority-designated settings and any user designated preferences are compared with the content of available television shows. Next, block 134 illustrates transmitting the authorized selection of products/services for the user to the user's portable computer system. Thereafter, block 136 depicts designating a selection of advertisements from the advertising database according to authority-designated settings and user-designated preferences. Next, block 138 illustrates controlling output of the selection of advertisements to multiple output interfaces accessible to the user. Thereafter, block 140 depicts designating instructions to staff for the user according to authority-designated settings and user-designated preferences. Next, block 142 illustrates controlling output of the instructions to output interfaces accessible to the staff; and the process passes to block 144.

Block 144 illustrates a determination as to whether or not a request from the user's portable computer system for a particular product/service has been received. If a request has not been received after a particular period of time, then the process ends. If a request is received, then the process passes to block 146. Block 146 depicts transmitting a recordation of authorization of the portable computer system and allowing the user access to the content of the product/service; and the process ends. In addition, additional steps may be included to perform electronic payment and ticket transactions according to the user's request.

Block 148 depicts comparing the authority designated settings with the content of the single point entry. Next, block 150 illustrates a determination as to whether or not access is authorized. If access is not authorized, then the process passes to block 156. Block 156 depicts transmitting a denial of authorization record to the portable computer system; and the process ends. If access is authorized, then the process passes to block 152. Block 152 illustrates transmitting an authorization record to the portable computer system. Next, block 154 depicts transmitting an access signal to a check point to allow the user to access the content at the single point entry; and the process ends.

Figure 5:
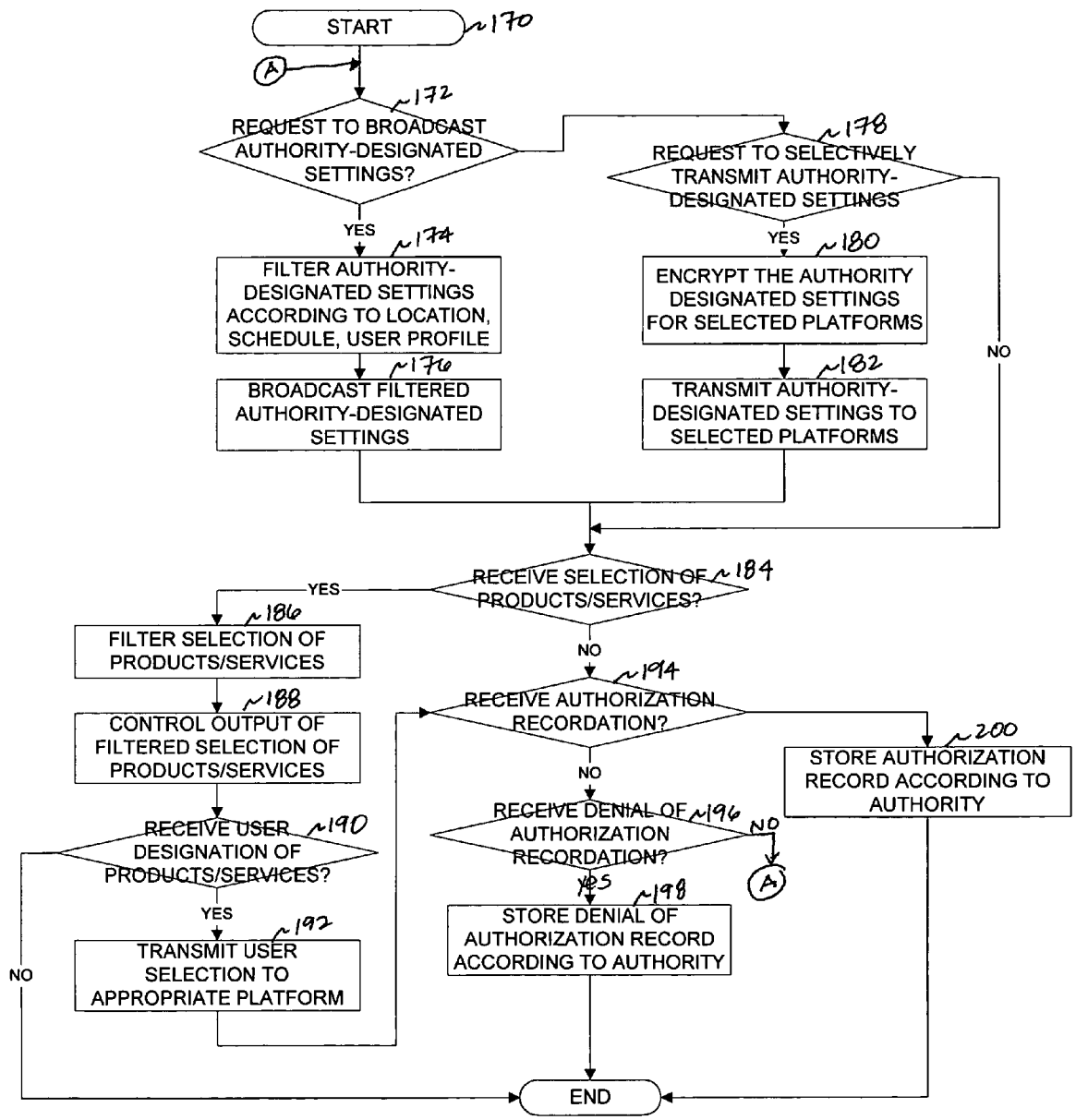
FIG. 5 depicts a high level logic flowchart of a process and program for controlling a portable computer system in accordance with the present invention.

Referring now to FIG. 5, there is illustrated a high level logic flowchart of a process and program and program for controlling a portable computer system in accordance with the present invention. As depicted, the process starts at block 170 and thereafter proceeds to block 172. Block 172 illustrates a determination as to whether or not a request to broadcast authority-designated settings is received. A user may make the request or an authority-designated setting may make the request. If a request to broadcast authority-designated settings is not received, then the process passes to block 178. If a request to broadcast authority-designated settings is received, then the process passes to block 174. Block 174 depicts filtering the authority-designated settings according to criteria such as location, schedule, and user profile. Next, block 176 illustrates broadcasting the filtered authority-designated settings; and the process passes to block 184.

Block 178 depicts a determination as to whether or not a request to selectively transmit authority-designated settings is received. If a request to selectively transmit is not received, then the process passes to block 184. If a request to selectively transmit is received, then the process passes to block 180. Block 180 illustrates encrypting the authority-designated settings according to the selection of platforms to received the authority-designated settings. Next, block 182 depicts transmitting the authority-designated settings to the selected platforms; and the process passes to block 184.

Block 184 illustrates a determination as to whether or not a selection of products/services is received. If a selection of products/services is not received, then the process passes to block 194. If a selection of products/services is received, then the process passes to block 186. Block 186 depicts filtering the selection of products/services according to location, schedule, user profile and other filtering settings. Next, block 188 illustrates controlling output of the filtered selection of products/services to a user output interface. Thereafter, block 190 depicts a determination as to whether or not a user or authority designation of products/services is received. If a designation of products/services is not received, then the process ends. If a designation of products/services is received, then the process passes to block 192. Block 192 illustrates transmitting the selection of products/services to the appropriate platform; and the process passes to block 194.

Block 194 depicts a determination as to whether or not an authorization recordation is received. If an authorization recordation is received, then the process passes to block 200. Block 200 illustrates storing the authorization record according to the authority whose authority-designated setting authorized the record; and the process ends. If an authorization recordation is not received, then the process passes to block 196. Block 196 depicts a determination of whether or not a denial of authorization recordation is received. If a denial record is not received, then the process passes to block 172. If a denial record is received, then the process passes to block 198. Block 198 illustrates storing the denial of authorization record according to the authority whose authority-designated setting denied the authorization record; and the process ends.

With reference now to FIG. 6, there is illustrated a pictorial illustration of multiple data storage structures for storing authority-designated settings and other data in accordance with the method, system and program of the present invention. As depicted, a data storage structure 220 includes a listing of authority-designated settings according to authority and type of setting for a particular child. For example, parent A has set a television setting of access only to PG or less and access for one hour daily. Advantageously, every television that is accessible to the child is only accessible according to the authority-designated setting.

In another example illustrated, both parent A and library A include settings for books. According to the combination of the settings, the child will only be allowed to check out two or less Dr. Seuss books at any library that is equipped with authority-enabled check-out systems.

In addition, a data storage structure 222 includes a listing of user-designated preferences for the particular child. For example, a child has designated a preferences for cartoons on television. Therefore, a television that receives authority-designated settings and user-designated settings for the child will first select television programs that are rated PG or lower and last an hour or less. Then the television will further filter that selection to highlight cartoons.

Moreover, a data storage structure 224 includes a listing of authorities and passwords in order to access recorded authorization, denial of authorization and location (if applicable). In the example, Sylvia is parent A and has designated a list of authorities for the child including herself, parent B, library A, and babysitter A. Parent A is preferably given access to all data in the child's portable computer system according to graphical indicator 226 which is only designatable by parent A, while other authorities are only allowed access to particular records. In addition, any authority-designated settings which contradict those set by parent A are overridden. However, parent B is not given access to all data in the child's portable computer system, however may access authorization records that are a result of the authority-designated settings by parent B. For example, a record of radio listening is recorded in data storage structure 224 in association with the authority-designated setting by parent B in data storage structure 220 of radio access to classical or oldies radio stations only.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing access to content by a user, said method comprising the steps of:
   receiving entries for a plurality of authority-designated settings from a plurality of allowable authorities to said particular user at a portable data storage medium associated with said particular user, wherein said plurality of authority-designated settings designate levels of access to particular types of content;
   transmitting said plurality of authority-designated settings from said portable data storage medium to a plurality of authority-enabled systems, wherein each of said plurality of authority-enabled systems controls access to at least one type of content;
   receiving and storing at said portable data storage medium an indication of authorization for said particular user to said at least one type of content controlled by one of said plurality of authority-enabled systems, such that authorization for content to said particular user is monitored at said portable data storage medium; and
   filtering said plurality of authority-designated settings at a portable computer system comprising said portable data storage medium such that only a filtered selection from among said plurality of authority-designated settings are transmittable to said plurality of authority-enabled systems.

* * * * *